(No Model.)

F. SAUTER.
NOSE BAG.

No. 426,572. Patented Apr. 29, 1890.

Witnesses:
John Buckler,
L. H. Osgood,

Inventor
Frank Sauter,
By Worth Osgood
Attorney.

UNITED STATES PATENT OFFICE.

FRANK SAUTER, OF BROOKLYN, NEW YORK.

NOSE-BAG.

SPECIFICATION forming part of Letters Patent No. 426,572, dated April 29, 1890.

Application filed August 3, 1889. Serial No. 319,650. (No model.)

*To all whom it may concern:*

Be it known that I, FRANK SAUTER, of Brooklyn, county of Kings, and State of New York, have invented certain new and useful Improvements in Nose-Bags, of which the following is a full, clear, and exact description, reference being had to the accompanying drawings, and to the letters of reference marked thereon.

My invention relates, generally, to means or appliances for sustaining feed-bags or nose-bags upon the heads of horses and other animals, and especially to a device for checking and holding the bag in the position to which it may be elevated when in use, which device or appliance I call a "feed-bag check."

The object of my invention is to provide or produce a simple, cheap, effective, and desirable check and to combine the same with means for suspending or sustaining a feed-bag in such manner that the bag may be elevated by upward movement of the animal's head, and when so elevated will be checked or held until again elevated, in order that the supply of food in the bag may be gradually consumed and gradully brought within easy reach of the animal until entirely consumed, and this without spilling or wasting any of the contents of the bag.

To accomplish all of this and to secure other and further advantages in the matters of construction, operation, and use, my improvements involve certain new and useful arrangements or combinations of parts and peculiarities of construction, as will be herein first fully described, and then pointed out in the claims.

Figure 1:
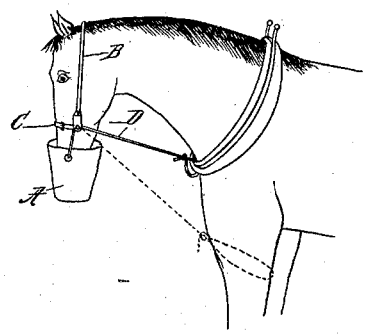
Figure 3:
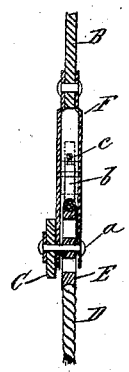
Figure 2:
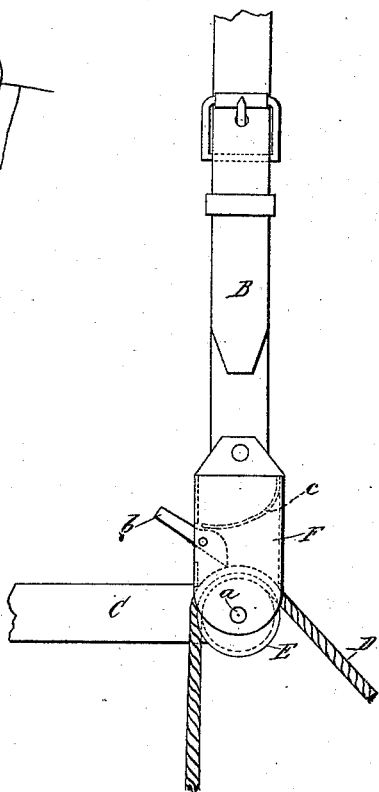

In the accompanying drawings, forming part of this specification, Figure 1 is a side view showing my improved device applied in connection with a feed-bag and in position for use. Fig. 2 is a side view of the improved check, showing portions of the head and nose straps and of the line or strap which is to be connected with the bag. Fig. 3 is a vertical sectional view of the check at right angles to Fig. 2.

In all the figures like letters of reference, wherever they occur, indicate corresponding parts.

A represents the feed-bag or nose-bag, which may be of any of the usual forms.

B is a strap or other band intended to pass over the head of the animal, and C is a similar strap or band, called a "nose-band," and intended to pass around the front of the head.

D is a rope or cord or strap attached to feed-bag A, passing thence over a suitable pulley E, sustained by the head-strap, and thence back to the collar or any convenient part of the harness, where it is made fast, being drawn tight enough to sustain the feed-bag at the proper height when the animal commences to feed.

The line D may be fastened around the fore leg of the animal, as indicated by dotted lines in Fig. 1, so that the improved appliance may be used independently of any harness.

The pulley E is sustained in a suitable metallic casing F, to which the head-band and nose-band may be conveniently attached, as by rivets, as plainly indicated. The rivet *a*, by which the nose-band is attached, may also serve as an axle on which pulley E may revolve.

The pulley is only used to diminish friction and prevent wearing of line D. It is preferred, of course, but the line might run over any other guide.

At *b* is a lever or check pivoted in casing F, and arranged to ride upon line D, permitting said line to run easily in one direction and preventing it from moving back in the opposite direction until purposely released. A spring *c* operates to hold the end of lever *b* normally in contact with line D. This spring is located in the casing, so as to be protected from damage. The lever or check *b* extends at one end outside the casing, so that by depressing this projecting end the line D may be free to travel back and the bag thus lowered. The bearing end of the check is preferably cut at an angle, as shown, the better to engage with the rope or line which it is to control; but it might be otherwise shaped, and it may be replaced by any equivalent check or cam which will operate in like manner and for like purposes. One of these checks is placed on each side of the animal's head, and being constructed substantially as explained and the feed-bag applied for use with the improved check, the animal proceeds to eat the food placed in the bag. When so much is consumed as is within easy reach, the animal naturally tosses his head to bring the remainder up. This movement raises the bag a trifle, the line D moving on pulley E. When the animal lowers his head, the check *b* arrests line D, and thus the bag. The bag A is thus raised as often as may be required and the food brought to the proper height. A few movements of the head are all that is necessary, and the animal rapidly learns to feed from the bag.

To detach the bag the checks *b* are released by the hand, the bag lowered and removed from the head.

The improved device is easily and cheaply made and enables the animal to feed with comfort and convenience and without unnecessary jerking and tossing of the bag, by which the food is wasted.

Having now fully described my invention, what I claim as new herein, and desire to secure by Letters Patent, is—

1. In a feed-bag attachment, the combination, with a head-band and nose-band, of a line for sustaining the feed-bag and a pulley or guide connected with said head and nose bands and receiving the line, and an automatic check operating in connection with the said line, substantially as and for the purposes set forth.

2. The combination of the head-band and nose-band, casing secured to both bands, pulley or guide, lever or check, spring bearing on the lever, and the line or rope connected with the feed-bag and operated upon by said lever, substantially as shown and described.

In testimony that I claim the foregoing I have hereunto set my hand in the presence of two witnesses.

FRANK SAUTER.

Witnesses:
 JOHN BUCKLER,
 WORTH OSGOOD.